US012798418B2

(12) United States Patent
Matsui et al.

(10) Patent No.: US 12,798,418 B2
(45) Date of Patent: Nov. 17, 2026

(54) OVERHEAD CHARGING APPARATUS FOR ELECTRIC VEHICLES

(71) Applicant: Honda Motor Co., Ltd., Tokyo (JP)

(72) Inventors: Ryuta Matsui, Redondo Beach, CA (US); Takero Arima, Torrance, CA (US)

(73) Assignee: Honda Motor Co., Ltd., Tokyo (JP)

(*) Notice: Subject to any disclaimer, the term of this patent is extended or adjusted under 35 U.S.C. 154(b) by 722 days.

(21) Appl. No.: 18/365,011

(22) Filed: Aug. 3, 2023

(65) Prior Publication Data

US 2025/0042281 A1 Feb. 6, 2025

(51) Int. Cl.
*B60L 53/35* (2019.01)
*B60L 53/18* (2019.01)

(52) U.S. Cl.
CPC ............... *B60L 53/35* (2019.02); *B60L 53/18* (2019.02)

(58) Field of Classification Search
CPC ................................. B60L 53/35; B60L 53/18
USPC .......................................................... 320/109
See application file for complete search history.

(56) References Cited

U.S. PATENT DOCUMENTS

| | | | | |
|---|---|---|---|---|
| 5,323,099 | A * | 6/1994 | Bruni | H02J 50/10 320/108 |
| 9,457,674 | B2 * | 10/2016 | Bianco | B60L 53/18 |
| 11,305,658 | B2 | 4/2022 | Fagan | |
| 11,602,994 | B2 * | 3/2023 | Penilla | B60L 1/003 |
| 2012/0013300 | A1 * | 1/2012 | Prosser | B60L 1/003 320/109 |
| 2019/0061542 | A1 * | 2/2019 | Zhao | B25J 5/02 |
| 2021/0114476 | A1 * | 4/2021 | Spaninks | B60L 53/16 |
| 2022/0055491 | A1 * | 2/2022 | Labell | B60L 53/16 |
| 2022/0055495 | A1 * | 2/2022 | Labell | B60L 53/16 |
| 2024/0294081 | A1 * | 9/2024 | Zimmerman | B25J 11/00 |

FOREIGN PATENT DOCUMENTS

| | | | |
|---|---|---|---|
| CN | 101937596 | B | 6/2015 |
| CN | 206884780 | U | 1/2018 |
| CN | 207711842 | U | 8/2018 |
| CN | 108995543 | A | 12/2018 |
| CN | 109050279 | A | 12/2018 |
| CN | 111546918 | A | 8/2020 |
| CN | 114714949 | A | 7/2022 |
| JP | 5586975 | B2 | 9/2014 |
| KR | 20180007765 | A | 1/2018 |
| WO | 2017221207 | A1 | 12/2017 |
| WO | 2019042113 | A1 | 3/2019 |

* cited by examiner

*Primary Examiner* — Nathaniel R Pelton
(74) *Attorney, Agent, or Firm* — Joshua Freier; American Honda Motor Co., Inc.

(57) ABSTRACT

A charging apparatus for charging of electric vehicles is provided. The charging apparatus includes a support structure disposed at a height above a floor surface. The charging apparatus further includes a cable holder disposed on the support structure. The cable holder includes an electric cable. The charging apparatus further includes an actuation mechanism coupled to the cable holder. The actuation mechanism controls a movement of the electric cable from the cable holder. The charging apparatus further include a power supply equipment coupled to the actuation mechanism. The power supply equipment, the actuation mechanism and the cable holder are coupled to each other, to form a unitary structure that is configured to move on the support structure.

18 Claims, 10 Drawing Sheets

OVERHEAD CHARGING APPARATUS FOR ELECTRIC VEHICLES

BACKGROUND

Electric vehicles are generally charged via an Electric Vehicle Supply Equipment (EVSE). The EVSE may be mounted on a specific area (such as a wall or a floor) of a building (such as, a parking lot). In a charging event, the electric vehicle may be parked proximate the EVSE, such that, an electric cable from the EVSE may connect with a charging socket of the electric vehicle, to charge the electric vehicle. In certain instances, the electric vehicle may be parked away from the EVSE (for example, at a different location and/or at a different orientation). In such instances, for each charging event, the EVSE may require an electric cable with a varying length to connect with the charging socket of the electric vehicle parked at a specific location and/or at a specific orientation in the parking lot. Therefore, the EVSE may occupy a significant amount of space to accommodate the electric cable with the varying length, in the parking lot.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a charging apparatus for charging of electric vehicles is provided. The charging apparatus may include a support structure disposed at a height above a floor surface. The charging apparatus may further include a cable holder disposed on the support structure. The cable holder may include an electric cable. The charging apparatus may further include an actuation mechanism coupled to the cable holder. The actuation mechanism is configured to control a movement of the electric cable from the cable holder. The charging apparatus may further include a power supply equipment coupled to the actuation mechanism. The power supply equipment, the actuation mechanism and the cable holder may be coupled to each other, to form a unitary structure that may be configured to move on the support structure.

According to an embodiment of the disclosure, a method for charging an electric vehicle is provided. The method may include disposing a support structure at a height above a floor surface. The method may further include disposing a unitary structure on the support structure. The unitary structure may include a cable holder with an electric cable, an actuation mechanism to control a movement of the electric cable, and a power supply equipment to control the actuation mechanism. The method may further include controlling the actuation mechanism to release the electric cable from the cable holder. The method may further include controlling the actuation mechanism to open a charging door for charging an electric vehicle. The method may further include connecting the electric cable with a socket of the electric vehicle to charge the electric vehicle.

According to another embodiment of the disclosure, a method for forming a charging apparatus is provided. The method may include disposing a support structure at a height above a floor surface. The method may further include disposing a cable holder on the support structure. The cable holder may include an electric cable. The method may further include coupling an actuation mechanism to the cable holder. The actuation mechanism may be configured to control a movement of the electric cable from the cable holder. The method may further include coupling a power supply equipment to the actuation mechanism, such that, the power supply equipment, the actuation mechanism, and the cable holder may be coupled to each other, to form a unitary structure that is configured to move on the support structure.

Figure 1:
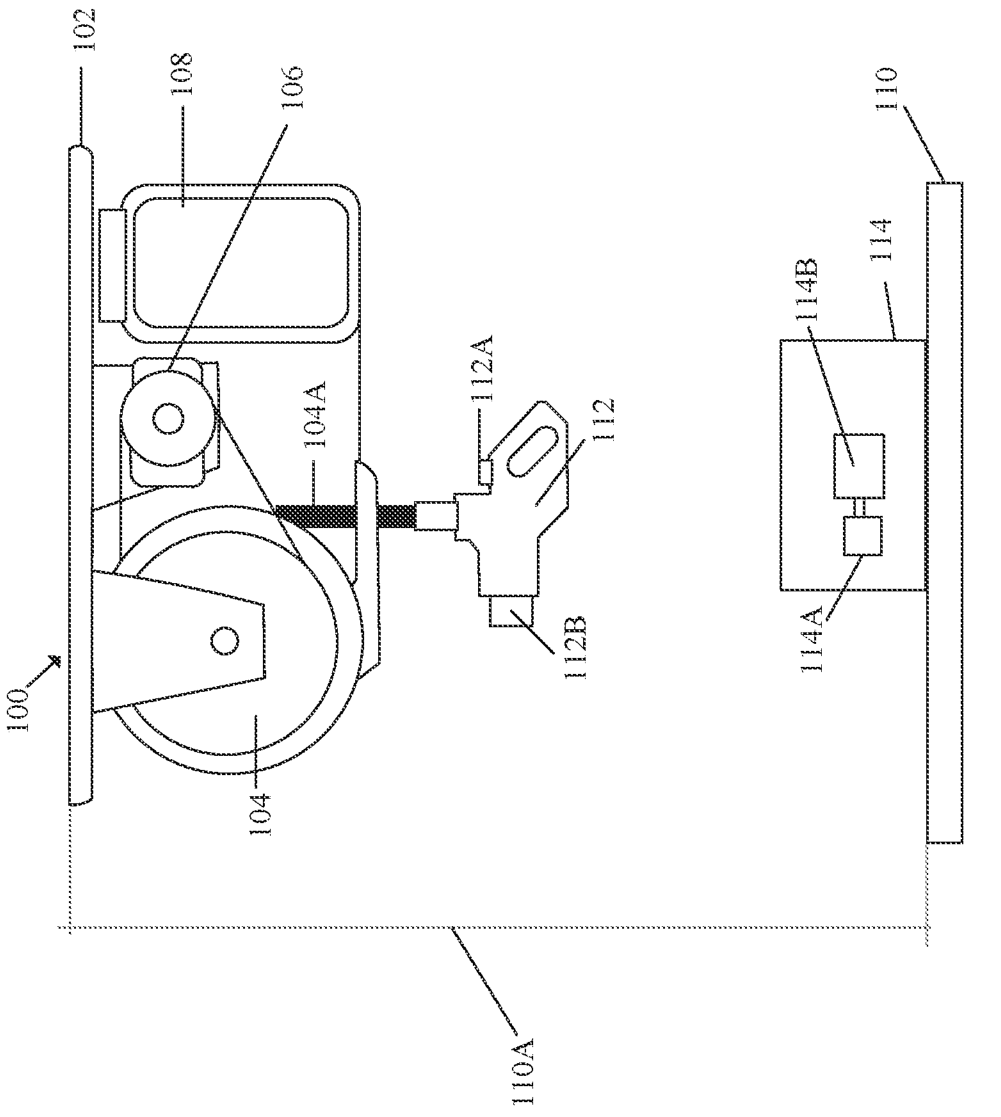
FIG. 1 is a diagram that illustrates an exemplary charging apparatus for charging of electric components, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed charging apparatus. The charging apparatus may include a support structure (for example, a guide rail) disposed at a height above a floor surface. The charging apparatus may further include a cable holder (for example, a pulley drive), an actuation mechanism (for example, a motor), and a power supply equipment (for example, an electric charging power module), which may be formed as a unitary structure and disposed on the support structure. The unitary structure may be configured to move on the support structure, to charge electric components (for example, electric vehicles). Therefore, even if an electric vehicle is parked away (for example, if parked in a specific location and/or a specific orientation) from the charging apparatus, the unitary structure may move on the support structure, towards corresponding location and/or corresponding orientation of the electric vehicle, to charge the electric vehicle. Further, as the charging apparatus is disposed at the height from the floor surface, there may be a significant amount of space saved in the floor surface, which may be used to park other electric vehicles.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a diagram that illustrates an exemplary charging apparatus for charging of electric components, in accordance with an embodiment of the disclosure. With reference to FIG. 1, there is shown a charging apparatus 100. The charging apparatus 100 may include a support structure 102, a cable holder 104 having an electric cable 104A and disposed on the support structure 102, an actuation mechanism 106 coupled to the cable holder 104, and a power supply equipment 108 coupled to the actuation mechanism 106. The support structure 102 may be disposed at a height 110A above a floor surface 110. The cable holder 104 may further include a handle 112 that may be configured to reach the floor surface 110, via the electric cable 104A, to charge an electric component 114 located on the floor surface 110.

The charging apparatus 100 may be configured to charge the electric component 114 located on the floor surface 110. In an embodiment, the charging apparatus 100 may be configured to be disposed at the height 110A from the floor surface 110 and charge the electric component 114 located on the floor surface 110. For example, the charging apparatus 100 may from a unitary structure that may be moved on the support structure 102, based on a location of the electric component 114, to initiate a charging event with the electric component 114. Therefore, even if the electric component 114 is disposed away (for example, if disposed in a specific location and/or a specific orientation) from the charging apparatus 100, the unitary structure may move on the support structure 102, towards corresponding location and/or corresponding orientation of the electric component 114, to charge the electric component 114. Further, as the charging apparatus 100 is disposed at the height 110A from the floor surface 110 and configured to move on the support structure 102 to respective locations of the electric component 114, there may be a significant amount of space saved in the floor surface 110, which may be used to dispose other electric components.

The support structure 102 may include a suitable design, shape, and structure, which may be configured to be disposed at the height 110A above the floor surface 110. In an embodiment, the support structure 102 may be a guide rail, which may be configured to be fastened with an additional support (not shown) at the height 110A above the floor surface 110. For example, the support structure 102 may include a plurality of rectangular frames that may be configured to form the guide rail, so that, the unitary structure of the charging apparatus 100 may move on such guide rail to charge the electric component 114 at the respective location and/or the respective orientation on the floor surface 110. In another example, the support structure 102 may be formed from a plurality of circular frames that may be configured to form the guide rail. In yet another example, the support structure 102 may be formed from a plurality of polygonal frames that may be configured to form the guide rail, for the movement of the unitary structure of the charging apparatus 100. In an embodiment, the support structure 102 may be fastened to one or more structural members (such as, a wall, a floor, a ceiling, a table, a rod, a wire, or a stand) located in an environment. Examples of the environment may include, but are not limited to, a garage, a private (such as a residential building) parking space, or a commercial (such as, public malls) parking space, which may include the wall for fastening the support structure 102 at the height 110A from the floor surface 110. In an embodiment, based on the fastening against the wall, the support structure 102 may firmly hold the cable holder 104.

The cable holder 104 may include a suitable design, shape, and structure, which may be disposed on the support structure 102 and may include the electric cable 104A. In an embodiment, the cable holder 104 may be formed as a pulley drive that may be configured to reel the electric cable 104A. For example, the pulley drive may be a machine that may include a grooved wheel (not shown), which is configured to reel the electric cable 104A. The electric cable 104A may circumferentially wound along the grooved wheel of the cable holder 104, which may be configured to releasably retract based on the charging event. In an embodiment, the cable holder 104 may be one of: a fixed pulley drive, a movable pulley drive, or a compound pulley drive. In certain instances, the cable holder 104 may be the fixed pulley drive that may have a stationary axle (not shown) and the electric cable 104A may be movably wound on such fixed pulley drive. In other instances, the cable holder 104 may be the movable pulley drive, which may include a pulley block (not shown) that may be configured to move along with the electric cable 104A. In yet other instances, the cable holder 104 may be the compound pulley drive, which may include a plurality of pulleys that may be configured to facilitate an enhanced movement of the electric cable 104A from the cable holder 104. Other examples of the cable holder 104 may include, but not limited to, a spool comprising a plurality of rims or an arm with a series of jointed segments, which may be configured to reel the electric cable 104A.

The electric cable 104A may include one or more electric wires which may be configured to transmit electrical power or signals from a source location (such as, the power supply equipment 108) to a destination location (such as, the electric component 114). In an embodiment, the electric cable 104A may transmit the electrical power or signals from the power supply equipment 108 to one or more electric vehicles. Details of such transmission of electrical power is described further, for example, in FIGS. 5A-5B.

The actuation mechanism 106 suitable logic, circuitry, and interfaces that may be configured to be coupled to the cable holder 104 and control a movement of the electric cable 104A from the cable holder 104. In an embodiment, the actuation mechanism 106 may be configured to control the pulley drive (i.e., the cable holder 104) to releasably reel the electric cable 104A. For example, the actuation mechanism 106 may include a motor (such as a stepper motor or a set of actuators), which may be configured to control a rotary movement of the pulley drive (i.e., the cable holder 104), such that, the rotary movement of the pulley drive may releasably retract the electric cable 104A from the pulley drive. In an example, the actuation mechanism 106 may include an electrical actuator which may be configured to transmit electrical signals to control the movement of the electric cable 104A from the cable holder 104. In another example, the actuation mechanism 106 may include a hydraulic actuator, which may be configured to transmit a hydraulic signal via double acting cylinders (DACs) to control the movement of the electric cable 104A from the cable holder 104. In yet another example, the actuation mechanism 106 may include a pneumatic actuator, which may be configured to transmit a pneumatic signal via double acting cylinders (DACs) to control the movement of the electric cable 104A from the cable holder 104. In yet another example, the actuation mechanism 106 may include a magnetic actuator, which may be configured to transmit magnetic and/or electromagnetic signals to control the movement of the electric cable 104A from the cable holder 104. In an embodiment, the actuation mechanism 106 may receive control signals (such as power signals) from the power supply equipment 108.

The power supply equipment 108 may be coupled to the actuation mechanism 106 and configured to supply electric power to the electric component 114, via the electric cable 104A. In an embodiment, the power supply equipment 108 may be an electric vehicle supply equipment, which may be configured to move on the guide rail. For example, the power supply equipment 108 may supply the electric power via the electric cable 104A, to charge the electric component 114 (such as electric vehicles). In some instances, the power supply equipment 108 may be configured to be inductively coupled to the support structure 102. In such instances, the actuation mechanism 106 and the cable holder 104 are configured to inductively receive the electric power supply from the support structure 102. For example, the support structure 102 may include a transmitting coil (not shown). The cable holder 104 and the actuation mechanism 106 may include a receiving coil (not shown). In the charging event, the charging apparatus 100 may be configured to supply the electric power from the transmitting coil of the support structure 102 to the receiving coil of the one of: the cable holder 104 and/or the actuation mechanism 106, which eventually charges the electric component 114.

The power supply equipment 108 may include an AC power source or a DC power source that may deliver the electric power to the electric component 114 via the electric cable 104A wounded on the cable holder 104. Examples of the power supply equipment 108 may include one of: a standard household 120-volt power source, or a 240-volt power source, or other fast charging power sources (such as a DC fast charging power source, or a battery pack), which may be disposed at the height 110A from the floor surface 110.

The floor surface 110 may be a part of the environment of the charging apparatus 100. For example, the floor surface 110 may be a part of the garage, the private parking space (such as the residential building), or the commercial parking space (such as, the public malls). In an embodiment, the charging apparatus 100 may be disposed at the height 110A from the floor surface 110, such that, the handle 112 is configured to reach the floor surface 110, via the electric cable 104A, and charge the electric component 114 located on the floor surface 110.

The handle 112 may include a suitable design, shape, and structure, which may be configured to be coupled at an end of the electric cable 104A that is wounded on the cable holder 104. In an embodiment, the handle 112 may be coupled with the end of the electric cable 104A, via a mechanical fastener (not shown). In another embodiment, the handle may have a selection button 112A, which may be configured to control the movement of the electric cable 104A, from the cable holder 104.

The selection button 112A may include a suitable design, shape, and structure, which may be configured to maneuver the movement of the charging apparatus 100. For example, the selection button 112A may be controlled to maneuver the movement of the electric cable 104A of the cable holder 104 associated with the charging apparatus 100. In an embodiment, the selection button 112A may be flushed with the handle 112. In another embodiment, the selection button 112A may be protruded from the handle 112. In the charging event, the selection button 112A may be configured to manually override the movement of the electric cable 104A from the cable holder 104.

In an embodiment, the handle 112 may further include an electric contact 112B, which may be configured to connect with a socket 114A associated with a battery 114B of the electric component 114, to charge the electric component 114. In an embodiment, the electric contact 112B may be formed as a plurality of connector pins that may protrude from a portion (not shown) of the handle 112. The plurality of connector pins may be aligned and mate with the socket 114A associated with the battery 114B of the electric component 114, to charge the electric component 114. In the charging event, the power supply equipment 108 may supply the electric power via the plurality of connector pins of the electric contact 112B to the socket 114A of the electric component 114. When the plurality of connector pins connects with the socket 114A, the electric component 114 may receive the electric power from the power supply equipment 108 and charge the battery 114B associated with the electric component 114.

In some instances, the electric component 114 may be an electric vehicle. The electric vehicle may include suitable logic, circuitry, and interfaces that may be configured to transmit to the charging apparatus 100, requests for charging of a battery pack of the electric vehicle. Based on the control of the charging apparatus 100, the electric vehicle may be configured to receive the electric power. Further, the electric vehicle may receive information associated with a charging status of the battery pack of the electric vehicle. For example, the electric vehicle may include one or more sensors that may determine a state of charge of the battery pack. Based on the state of charge of the battery pack, the charging apparatus 100 may control the electric power for efficiently charging the battery pack of the electric vehicle. Examples of the battery pack of the electric vehicle (such as the electric component 114) may include, but are not limited to, a lead acid battery, a nickel-cadmium battery, a nickel-metal hydride battery, or a lithium-ion battery.

The electric vehicle may be a non-autonomous vehicle, a semi-autonomous vehicle, or a fully autonomous vehicle, for example, as defined by National Highway Traffic Safety Administration (NHTSA) or Society of Automotive Engineers (SAE) automation levels. Examples of the electric vehicle may include, but are not limited to, an electric scooter, an electric bike, an electric bicycle, an electric hover board, an electric skateboard, a four-wheeled electric vehicle, a three-wheeled electric vehicle, a two-wheeler electric vehicle, an electric unicycle, a wheelchair with an actuator-based driving unit, a hybrid vehicle, or a vehicle with autonomous drive capability. The description of other types of the vehicles has been omitted from the disclosure for the sake of brevity.

In operation, the charging apparatus 100 may be disposed at the height 110A above the floor surface 110, to charge electric components (such as the electric component 114) located on the floor surface 110. As the charging apparatus 100 is disposed at the height 110A from the floor surface 110, there may be a significant amount of space saved in the floor surface 110, which may be used to park other electric components.

In an embodiment, the power supply equipment 108, the actuation mechanism 106, and the cable holder 104 are coupled to each other, to form a unitary structure that is configured to move on the support structure 102. In an example, the actuation mechanism 106, and the cable holder 104 are conjoined as a singular unit and forms the unitary structure, which may be configured to be moved on the support structure 102. Based on a location of the electric component 114, the charging apparatus 100 may control the actuation mechanism 106 to move the unitary structure on the support structure to align the electric cable 104A with the socket 114A of the electric component 114 and perform the charging event for the electric component 114.

Therefore, even if the electric component 114 is disposed away (for example, if disposed in a specific location and/or a specific orientation) from the charging apparatus 100, the unitary structure may move on the support structure 102, towards corresponding location and/or corresponding orientation of the electric component 114, to perform the charging event for the electric component 114.

In the charging event, the charging apparatus 100 may be configured to control the actuation mechanism 106 to release the electric cable 104A from the cable holder 104. The charging apparatus 100 may further control the actuation mechanism 106 to open the charging door for charging the electric component 114 (such as, the electric vehicle). Based on opening of the charging door, the charging apparatus 100 may connect the electric contact 112B of the handle 112 with the socket 114A of the electric component 114 (such as, the electric vehicle), to charge the electric component 114. Based on a completion of the charging event for the electric component 114, the charging apparatus 100 may control the actuation mechanism 106 to release the electric cable 104A from the socket 114A. The charging apparatus 100 may further control the actuation mechanism 106 to retract the electric cable 104A towards the cable holder 104.

Figure 2:
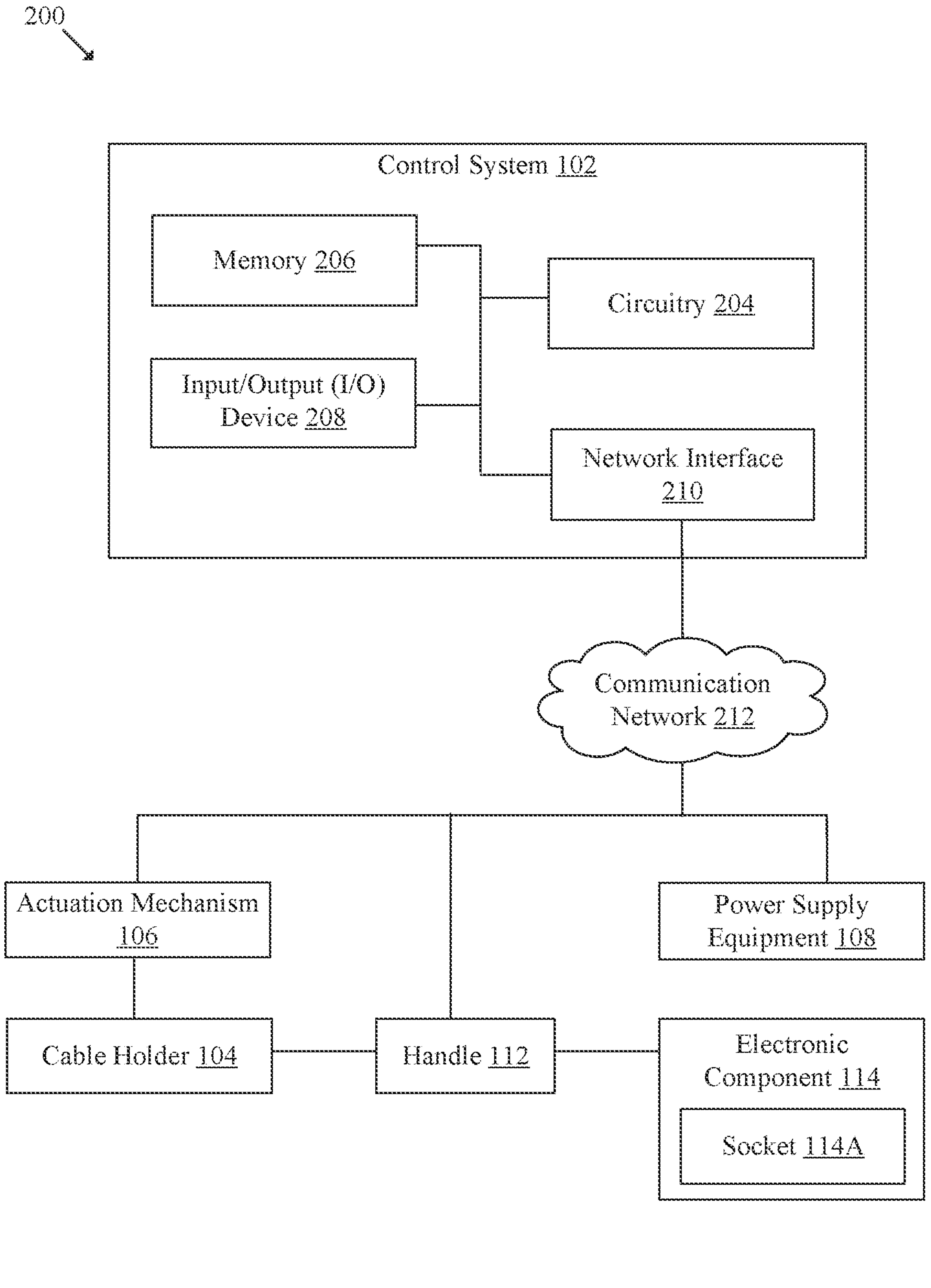
FIG. 2 is a block diagram that illustrates an exemplary control system for a charging apparatus, in accordance with an embodiment of the disclosure.

FIG. 2 is a block diagram that illustrates an exemplary control system for a charging apparatus, in accordance with an embodiment of the disclosure. FIG. 2 is explained in conjunction with elements from FIG. 1. With reference to FIG. 2, there is shown a block diagram 200 of a control system 202 for the charging apparatus 100. The control system 202 may include circuitry 204, a memory 206, an Input/Output (I/O) interface 208, and a network interface 210. In an embodiment, the network interface 210 of the control system 202 may be communicatively coupled to the actuation mechanism 106 and the power supply equipment 108, via a communication network 212.

The circuitry 204 may include suitable logic, circuitry, and/or interfaces code that may be configured to execute program instructions associated with different operations to be executed by the control system 202 or the charging apparatus 100. For example, some of the operations may include: control of the actuation mechanism 106 to release the electric cable 104A from the cable holder 104, control of the actuation mechanism 106 to open the charging door for charging the electric component 114 (such as, the electric vehicle), connection of the electric contact 112B of the handle 112 with the socket 114A of the electric component 114 (such as, the electric vehicle) to charge the electric component 114, control of the power supply equipment 108 to transmit the electric power from the power supply equipment 108 to the electric component 114 via the electric cable 104A, control of the actuation mechanism 106 to release the electric cable 104A from the socket 114A, and control of the actuation mechanism 106 to retract the electric cable 104A towards the cable holder 104. In an alternate embodiment, few operations, such as, control of the actuation mechanism 106 to move the electric cable 104A towards and away from the electric component 114, may be performed by the handle 112, via the communication network 212, which may be configured by the circuitry 204.

The circuitry 204 may include any suitable special-purpose or general-purpose computer, computing entity, or processing device including various computer hardware or software modules and may be configured to execute instructions stored on any applicable computer-readable storage media. For example, the circuitry 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 204 may include any number of processors configured to, individually or collectively, perform or direct performance of any number of operations of the control system 202 or the charging apparatus 100, as described in the present disclosure. Examples of the processor may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 206 may include suitable logic, circuitry, interfaces, and/or code that may be configured to store the program instructions executable by the circuitry 204. In at least one embodiment, the memory 206 may be further configured to store control instructions for the actuation mechanism 106 to control the movement of the electric cable 104A in the cable holder 104. The memory 206 may be further configured to store control instructions for the handle 112 to control the actuation mechanism 106 and the power supply equipment 108. The memory 206 may be further configured to store control instructions for the power supply equipment 108 to perform the charging event for the electric component 114. Example implementations of the memory 206 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O interface 208 may include suitable logic, circuitry, interfaces, and/or code that may be configured to receive an input and provide an output based on the received input from at least one of: the control system 202, the handle 112, the actuation mechanism 106, the power supply equipment 108, or an operator (not shown) associated with the electric component 114. The I/O interface 208 may include one or more input and output devices that may communicate with different components of the charging apparatus 100. For example, the I/O interface 208 may receive user inputs, via a touchscreen of at least one of: the handle 112, the power supply equipment 108, or an operator device (such as a mobile phone) associated with the operator of the electric component 114, to trigger execution of the program instructions associated with different operations executed by the control system 202. Examples of the I/O interface 208 may include, but are not limited to, a touchscreen, a keyboard, a mouse, a joystick, a microphone, a display device, or a speaker.

The network interface 210 may include suitable logic, circuitry, and interfaces that may be configured to facilitate communication between the control system 202, the actuation mechanism 106, the power supply equipment 108, or the handle 112, via the communication network 212. The network interface 210 may be implemented by use of various known technologies to support wired or wireless communication of the control system 202 with the communication network 212. The network interface 210 may include, but not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a near field communication protocol, a wireless pear-to-pear protocol, a protocol for email, instant messaging, and a Short Message Service (SMS).

The communication network 212 may include a communication medium through which the charging apparatus 100, the control system 202, the actuation mechanism 106, the power supply equipment 108, or the handle 112, may communicate with each other. The communication network 212 may include one of: a wired connection or a wireless connection. Examples of the communication network 212 may include, but are not limited to, the Internet, a cloud network, a Cellular or Wireless Mobile Network (such as a Long-Term Evolution and 5G New Radio), a Wireless Fidelity (Wi-Fi) network, a Personal Area Network (PAN), a Local Area Network (LAN), or a Metropolitan Area Network (MAN). Various devices of the charging apparatus 100 may be configured to connect to the communication network 212 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In an embodiment, the communication network 212 may be an in-vehicle network that may include a medium through which the various control units, components, and/or systems, for example, the actuation mechanism 106, the power supply equipment 108, or the handle 112, may communicate with the control system 202. In accordance with an embodiment, in-vehicle communication of audio/video data may occur by use of Media Oriented Systems Transport (MOST) multimedia network protocol of the in-vehicle network or other suitable network protocols for vehicle communication. The in-vehicle network may facilitate access control and/or communication between the circuitry 204 and other ECUs, such as ECM or a telematics control unit (TCU) of the electric component 114 (such as, the electric vehicle).

Various devices or components in the electric component 114 may connect to the communication network 212 (such as, the in-vehicle network), in accordance with various wired and wireless communication protocols. Examples of the wired and wireless communication protocols for the in-vehicle network may include, but are not limited to, a vehicle area network (VAN), a controller area network (CAN) bus, a Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

Figure 3:
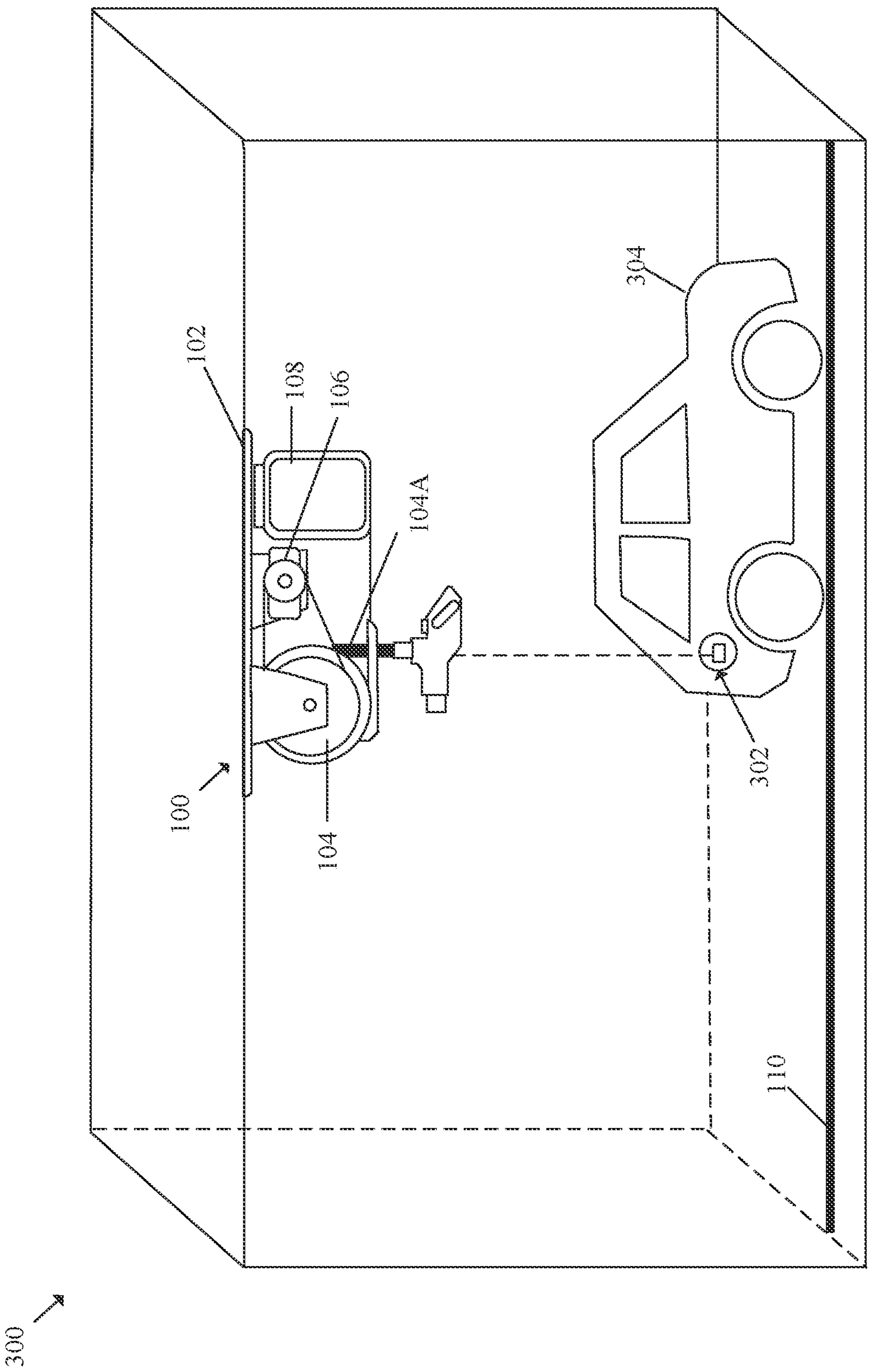
FIG. 3 is a diagram that illustrates an exemplary structural configuration for charging an electric vehicle, via the charging apparatus of FIG. 1, in accordance with an embodiment of the disclosure.

FIG. 3 is a diagram that illustrates an exemplary structural configuration for charging an electric vehicle, via the charging apparatus of FIG. 1, in accordance with an embodiment of the disclosure. FIG. 3 is explained in conjunction with elements from FIG. 1 and FIG. 2. With reference to FIG. 3, there is shown an exemplary structural configuration 300 of the charging apparatus 100. In the exemplary structural configuration 300, there is shown the charging apparatus 100, which may be configured to control a charging door 302 of an electric vehicle 304. For example, in the charging event, the actuation mechanism 106 may be configured to control the charging door 302 of the electric vehicle 304, to charge the electric vehicle 304.

The charging door 302 may be one of: a lid of the socket 114A of the electric vehicle 304 or a garage door (not shown) of the electric vehicle 304. In an example, the charging door 302 may be a part of the electric vehicle 304, which is configured to conceal the socket 114A of the electric vehicle 304. In another example, the charging door 302 may be a part of a garage (not shown), which is configured to conceal a parking space of the electric vehicle 304. In an embodiment, the charging door 302 may be a panel or a flap that may be located at a side (such as a left side or a right side) of the electric vehicle 304 or at a front of the electric vehicle 304. In an embodiment, the charging door 302 is pivoted from a part (not shown) of the electric vehicle 304 and configured to be re-closable based on the charging event. For example, in the charging event, the actuation mechanism 106 may be configured to control the charging door 302 of the electric vehicle 304, such that, the charging door 302 may be opened to allow connection between the electric contact 112B of the handle 112 (shown in FIG. 1) and the socket 114A of the electric vehicle 304, to charge the electric vehicle 304. In another example, based on a completion of the charging event, the actuation mechanism 106 may be configured to control the charging door 302, such that, the charging door 302 may be closed to disconnect the connection between the electric contact 112B of the handle 112 and the socket 114A of the electric vehicle 304, to stop charging the electric vehicle 304. In an embodiment, the charging door 302 may include an indicator light or a display (not shown) that is configured to provide information about a charging status (such as a level of charge, or an estimated remaining time until full charge, etc.) of the electric vehicle 304.

The electric vehicle 304 may include suitable logic, circuitry, and interfaces that may be configured to transmit to the charging apparatus 100, requests for charging of a battery pack of the electric vehicle 304. Based on the control of the charging apparatus 100, the electric vehicle 304 may be configured to receive the electric power. Further, the electric vehicle 304 may receive information associated with a charging status of the battery pack of the electric vehicle 304. For example, the electric vehicle 304 may include one or more sensors that may determine a state of charge of the battery pack and display the determined state of charge in the display of the charging door 302. Based on the state of charge of the battery pack, the charging apparatus 100 may control the electric power for efficiently charging the battery pack of the electric vehicle 304. Examples of the battery pack of the electric vehicle 304 may include, but are not limited to, a lead acid battery, a nickel-cadmium battery, a nickel-metal hydride battery, or a lithium-ion battery.

The electric vehicle 304 may be a non-autonomous vehicle, a semi-autonomous vehicle, or a fully autonomous vehicle, for example, as defined by National Highway Traffic Safety Administration (NHTSA) or Society of Automotive Engineers (SAE) automation levels. Examples of the electric vehicle 304 may include, but are not limited to, an electric scooter, an electric bike, an electric bicycle, an electric hover board, an electric skateboard, a four-wheeled electric vehicle, a three-wheeled electric vehicle, a two-wheeler electric vehicle, an electric unicycle, a wheelchair with an actuator-based driving unit, a hybrid vehicle, or a vehicle with autonomous drive capability. The description of other types of the vehicles has been omitted from the disclosure for the sake of brevity.

Figure 4A:
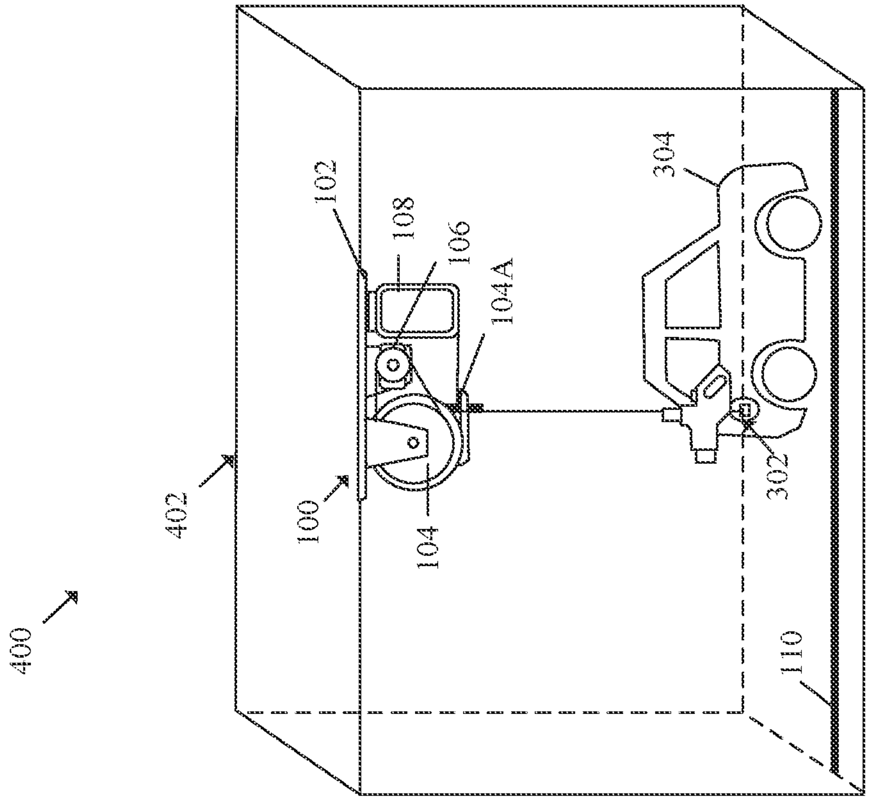
FIGS. 4A and 4B are diagrams that collectively illustrate a first exemplary scenario to depict an operation of a charging apparatus to charge an electric vehicle, in accordance with an embodiment of the disclosure.
Figure 4B:
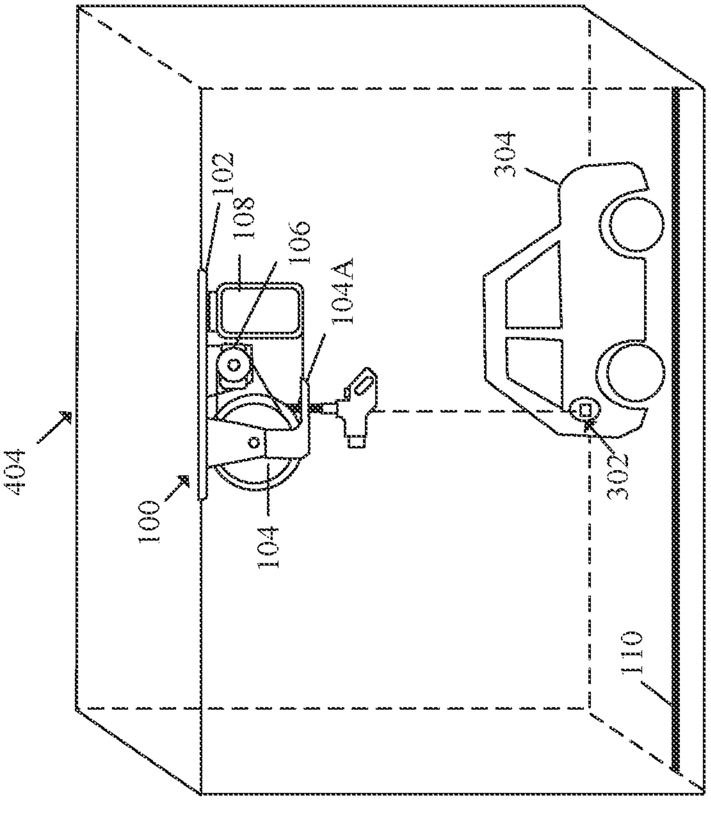

FIGS. 4A and 4B are diagrams that collectively illustrate a first exemplary scenario to depict an operation of a charging apparatus to charge an electric vehicle, in accordance with an embodiment of the disclosure. FIGS. 4A and 4B are explained in conjunction with elements from FIG. 1, FIG. 2, and FIG. 3. With reference to FIGS. 4A-4B, there is shown an extension operation 402 and a retraction operation 404.

In the extension operation 402, the charging apparatus 100 may perform the charging event. In the charging event, the actuation mechanism 106 may be configured to control the movement of the electric cable 104A from the cable holder 104 towards the floor surface 110. For example, in the charging event, the actuation mechanism 106 may trigger the cable holder 104 to unreel the electric cable 104A towards the floor surface 110. When the electric cable 104A is proximate the charging door 302 of the electric vehicle 304, the actuation mechanism 106 may be configured to control the charging door 302 of the electric vehicle 304, to charge the electric vehicle 304.

In the retraction operation 404, the charging apparatus 100 may stop the charging event and retract the electric cable 104A back to into the cable holder 104. In an embodiment, based on a completion of the charging event, the actuation mechanism 106 may be configured to control the movement of the electric cable 104A from the floor surface 110 towards the cable holder 104. In certain instances, based on the completion of the charging event, the selection button 112A may be operated to control the charging door 302 of the electric vehicle 304. For example, the selection button 112A may be triggered to close the charging door 302 based on the completion of the charging event. In other instances, based on the completion of the charging event, the selection button 112A may also be operated to manually override the movement of the electric cable 104A from and/or towards the cable holder 104.

Figure 5A:
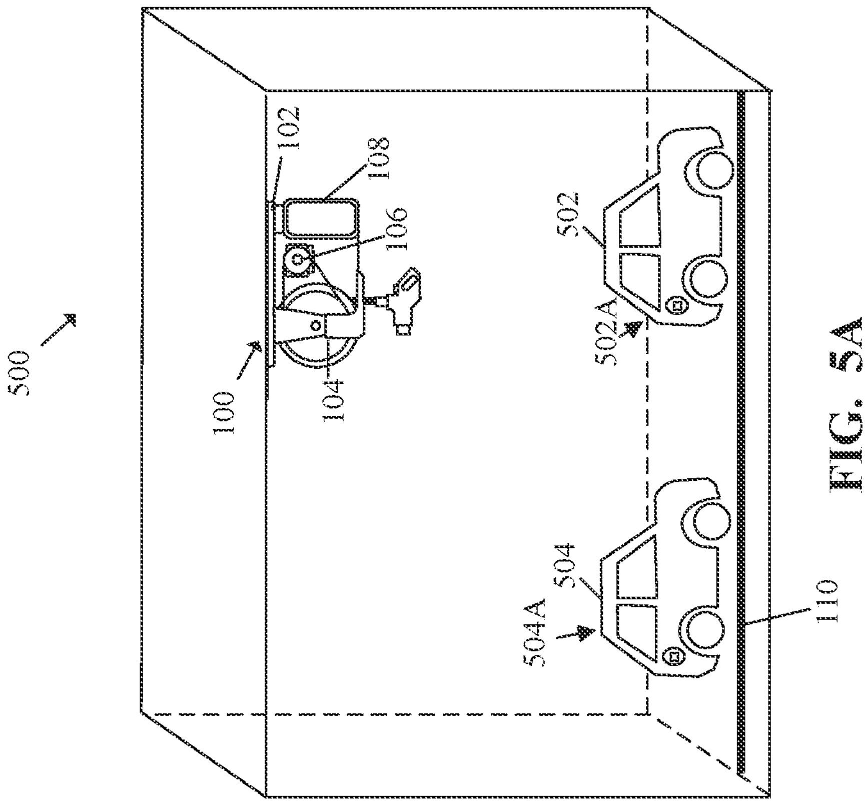
FIGS. 5A and 5B are diagrams that collectively illustrate a second exemplary scenario to depict an operation of a charging apparatus to charge electric vehicles, in accordance with an embodiment of the disclosure.
Figure 5B:
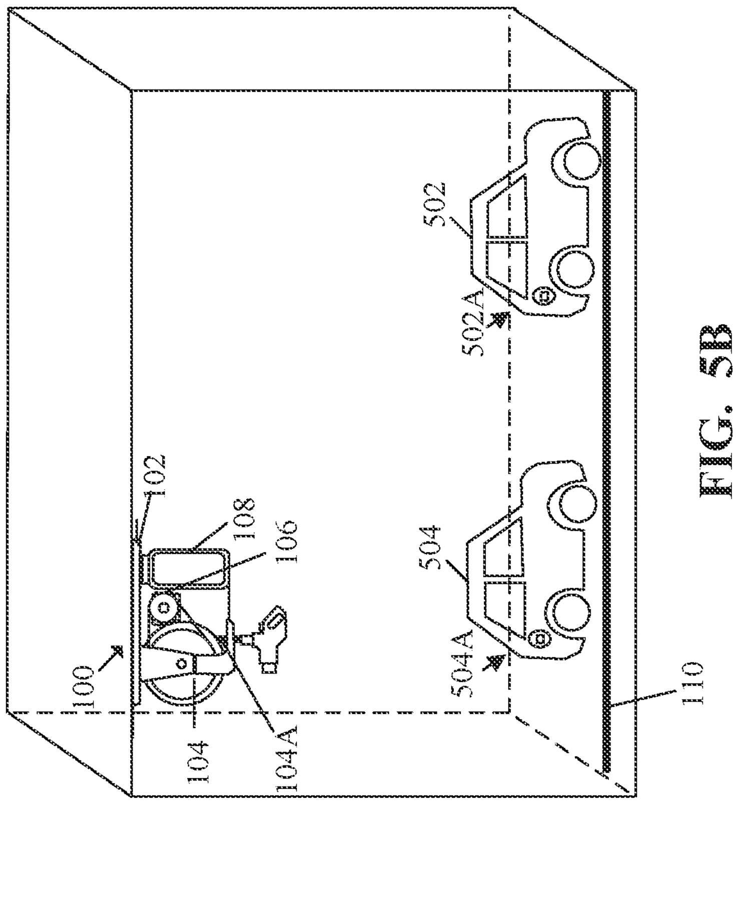

FIGS. 5A and 5B are diagrams that collectively illustrate a second exemplary scenario to depict an operation of a charging apparatus to charge electric vehicles, in accordance with an embodiment of the disclosure. FIGS. 5A and 5B are explained in conjunction with elements from FIG. 1, FIG. 2, FIG. 3, FIG. 4A and FIG. 4B. With reference to FIGS. 5A and 5B, there is shown a second exemplary scenario 500 of the charging apparatus 100 to charge one of: the first electric vehicle 502 or the second electric vehicle 504. The first electric vehicle 502 may be disposed at a first location 502A and the second electric vehicle 504 may be disposed at a second location 504A.

Referring to FIG. 5A, there is shown a first charging configuration. In the first charging configuration, the charging apparatus 100 may be configured to charge the first electric vehicle 502, which may be disposed at the first location 502A. During the charging event, the charging apparatus 100 control the actuation mechanism 106 to release the handle 112 and corresponding electric cable 104A from the cable holder 104, such that the handle 112 is proximate a socket of the first electric vehicle 502. The charging apparatus 100 may connect the electric contact 112B of the handle 112 with the socket of the first electric vehicle 502 to initiate the charging event. Based on a completion of the charging event, the charging apparatus 100 may control the actuation mechanism 106 to retract the handle and corresponding electric cable 104A towards the cable holder 104, such that, the electric cable 104A is reeled up on to the cable holder 104.

Referring to FIG. 5B, there is shown a second charging configuration. In the second charging configuration, based on the completion of the charging event for the first electric vehicle 502 at the first location 502A, the unitary structure of the charging apparatus 100 may be configured to move from the first location 502A to the second location 504A, via the support structure 102, to initiate another charging event for the second electric vehicle 504 located at the second location 504A. Based on the movement of the unitary structure of charging apparatus 100 proximate the second electric vehicle 504, the charging apparatus 100 may control the actuation mechanism 106 to release the handle 112 and corresponding electric cable 104A from the cable holder 104, such that the handle 112 (shown in FIG. 1) is proximate a socket of the second electric vehicle 504. The charging apparatus 100 may connect the electric contact 112B of the handle 112 with the socket of the second electric vehicle 504 to initiate the charging event. Based on a completion of the charging event, the charging apparatus 100 may control the actuation mechanism 106 to retract the handle and corresponding electric cable 104A towards the cable holder 104, such that, the electric cable 104A is reeled up on to the cable holder 104.

In operation, the power supply equipment 108 may be configured to activate the actuation mechanism 106 to control the movement of the unitary structure of the charging apparatus 100 on the support structure 102. In an embodiment, when the actuation mechanism 106 is activated based on the power supply equipment 108, the unitary structure of the charging apparatus 100 moved from the first location 502A of the floor surface 110 to the second location 504A of the floor surface 110, via the support structure 102. As the movement of the charging apparatus 100 occurs on the support structure 102, which is disposed at the height 110A from the floor surface 110, there may be a significant amount of space saved in the floor surface 110, which may be used to park other electric vehicles.

Figure 6A:
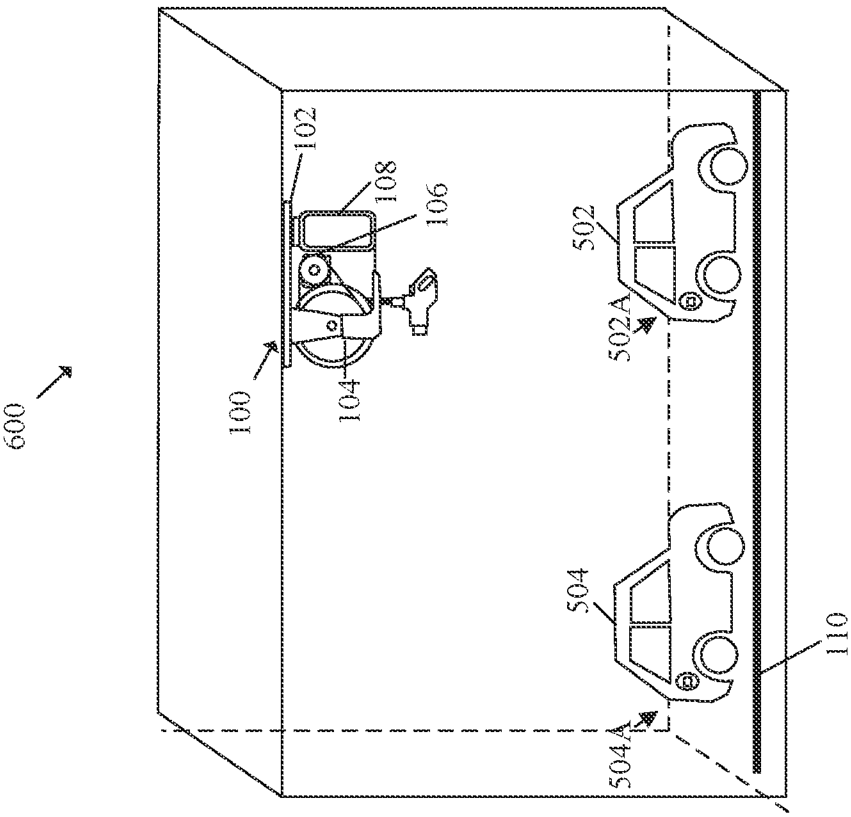
FIGS. 6A and 6B are diagrams that collectively illustrate a third exemplary scenario to depict an operation of a charging apparatus for charging of electric vehicles, in accordance with an embodiment of the disclosure.
Figure 6B:
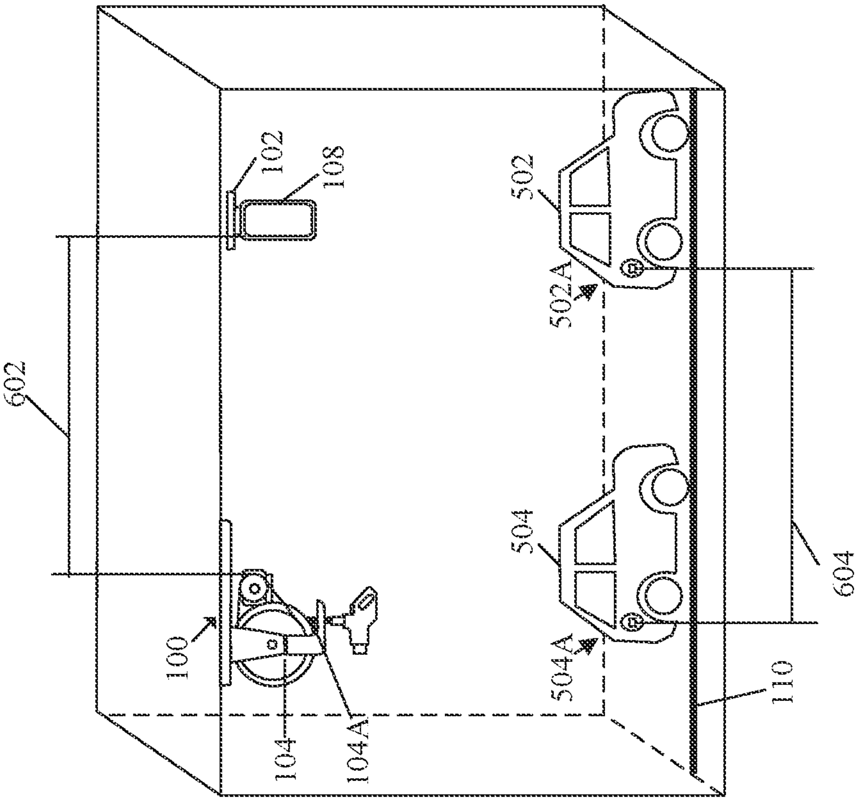

FIGS. 6A and 6B are diagrams that collectively illustrate a third exemplary scenario to depict an operation of a charging apparatus for charging of electric vehicles, in accordance with an embodiment of the disclosure. FIGS. 6A and 6B are explained in conjunction with elements from FIG. 1, FIG. 2, FIG. 3, FIG. 4A, FIG. 4B, FIG. 5A, and FIG. 5B. With reference to FIGS. 6A and 6B, there is shown a third exemplary scenario 600 of the charging apparatus 100. In the third exemplary scenario 600, there is shown the charging apparatus 100 that is configured to charge the first electric vehicle 502 and the second electric vehicle 504. The first electric vehicle 502 may be disposed at the first location 502A of the floor surface 110 and the second electric vehicle 504 may be disposed at the second location 504A of the floor surface 110.

Referring to FIG. 6A, there is shown a first charging configuration. In the first charging configuration, the charging apparatus 100 may be configured to charge the first electric vehicle 502, which may be disposed at the first location 502A. During the charging event, the charging apparatus 100 control the actuation mechanism 106 to release the handle 112 and corresponding electric cable 104A from the cable holder 104, such that the handle 112 is proximate a socket of the first electric vehicle 502. The charging apparatus 100 may connect the electric contact 112B of the handle 112 (shown in FIG. 1) with the socket of the first electric vehicle 502 to initiate the charging event. Based on a completion of the charging event, the charging apparatus 100 may control the actuation mechanism 106 to retract the handle and corresponding electric cable 104A towards the cable holder 104, such that, the electric cable 104A is reeled up on to the cable holder 104.

Referring to FIG. 6B, there is shown a second charging configuration. In the second charging configuration, the cable holder 104 and the power supply equipment 108 may be separated by a first distance 602 with each other. In an embodiment, the actuation mechanism 106 may be further configured to control the first distance 602 between the cable holder 104 and the power supply equipment 108. Further, the first location 502A of the first electric vehicle 502 and the second location 504A of the second electric vehicle 504 may be separated by a second distance 604.

In an embodiment, in additional to rotary movement of the cable holder 104, the actuation mechanism 106 may also control a linear movement of the cable holder 104 from the power supply equipment 108, based on the charging event and corresponding locations of electric vehicles (such as the first electric vehicle 502 and the second electric vehicle 504) parked on the floor surface 110.

In operation, based on the completion of the charging event for the first electric vehicle 502, the charging apparatus 100 may be configured to determine the second distance 604 of the second electric vehicle 504 from the first electric vehicle 502. In an example, the charging apparatus 100 may acquire information associated with the second distance 604, via a sensor (such as an image sensor, an optical sensor, a proximity sensor, etc.) associated with the charging apparatus 100. Based on the acquisition of the second distance 604, the charging apparatus may control the actuation mechanism 106 to control the movement of the cable holder 104 on the support structure 102 from the power supply equipment 108, such that, the first distance 602 is equal to the second distance 604 and initiate the charging event for the second electric vehicle 504.

In another embodiment, the handle 112 of the charging apparatus 100 may be used to manually override the movement of the cable holder 104 from the power supply equipment 108, such that, the cable holder 104 is moved from the power supply equipment 108 and located proximate to the second electric vehicle 504. The handle 112 may control the movement of the cable holder 104 on the support structure 102 from the power supply equipment 108, such that, the first distance 602 is equal to the second distance 604 and initiate the charging event for the second electric vehicle 504.

Figure 7:
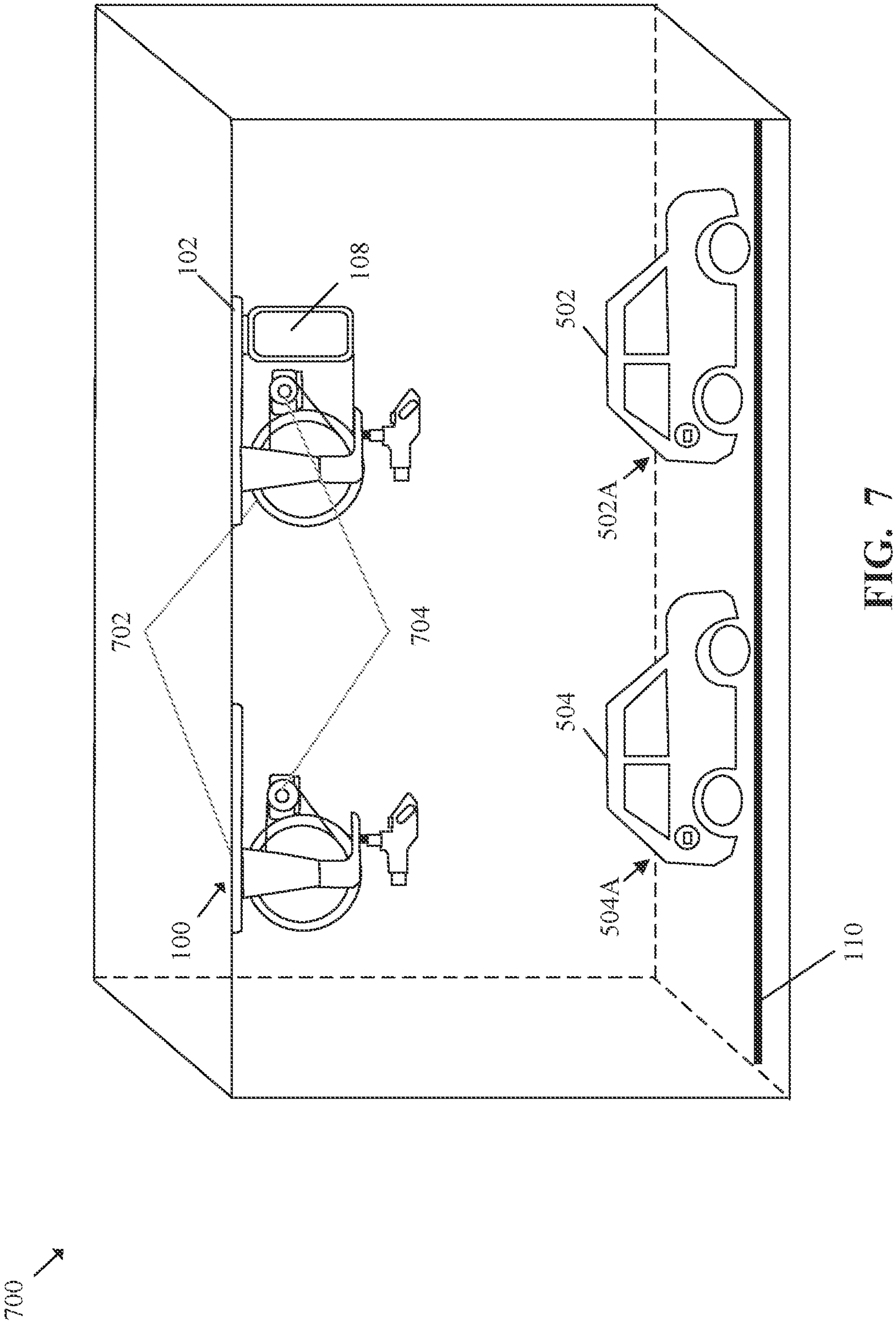
FIG. 7 is a diagram that illustrates a fourth exemplary scenario to depict an operation of a charging apparatus for charging of electric vehicles, in accordance with an embodiment of the disclosure.

FIG. 7 is a diagram that illustrates a fourth exemplary scenario to depict an operation of a charging apparatus for charging of electric vehicles, in accordance with an embodiment of the disclosure. FIG. 7 is explained in conjunction with elements from FIG. 1, FIG. 2, FIG. 3, FIG. 4A, FIG. 4B, FIG. 5A, FIG. 5B, FIG. 6A, and FIG. 6B. With reference to FIG. 7, there is shown a fourth exemplary scenario 700 of the charging apparatus 100. In the fourth exemplary scenario, there is shown a plurality of cable holders 702 and a plurality of actuation mechanisms 704.

In an embodiment, each cable holder of the plurality of cable holders 702 and each actuation mechanism of the plurality of actuation mechanisms 704 are coupled to the power supply equipment 108. For example, the charging apparatus 100 may include a single power supply equipment (such as the power supply equipment 108), which may be configured to supply electric power to the plurality of cable holders 702 and the plurality of the actuation mechanisms 704.

In operation, each cable holder of the plurality of cable holders 702 and corresponding actuation mechanism of the plurality of actuation mechanisms 704 may be configured to charge each electric vehicle (such as the first electric vehicle 502 and/or the second electric vehicle 504) of a plurality of electric vehicles. For example, the single power supply equipment (such as the power supply equipment 108) may be configured to supply electric power to all the cable holders of the plurality of cable holders 702 and all the actuation mechanisms of the plurality of actuation mechanisms 704, such that, all electric vehicles (such as, the first electric vehicle 502 and the second electric vehicle 504) parked on the floor surface 110, may be charged in a concurrent manner, without any delay in the charging event.

Figure 8:
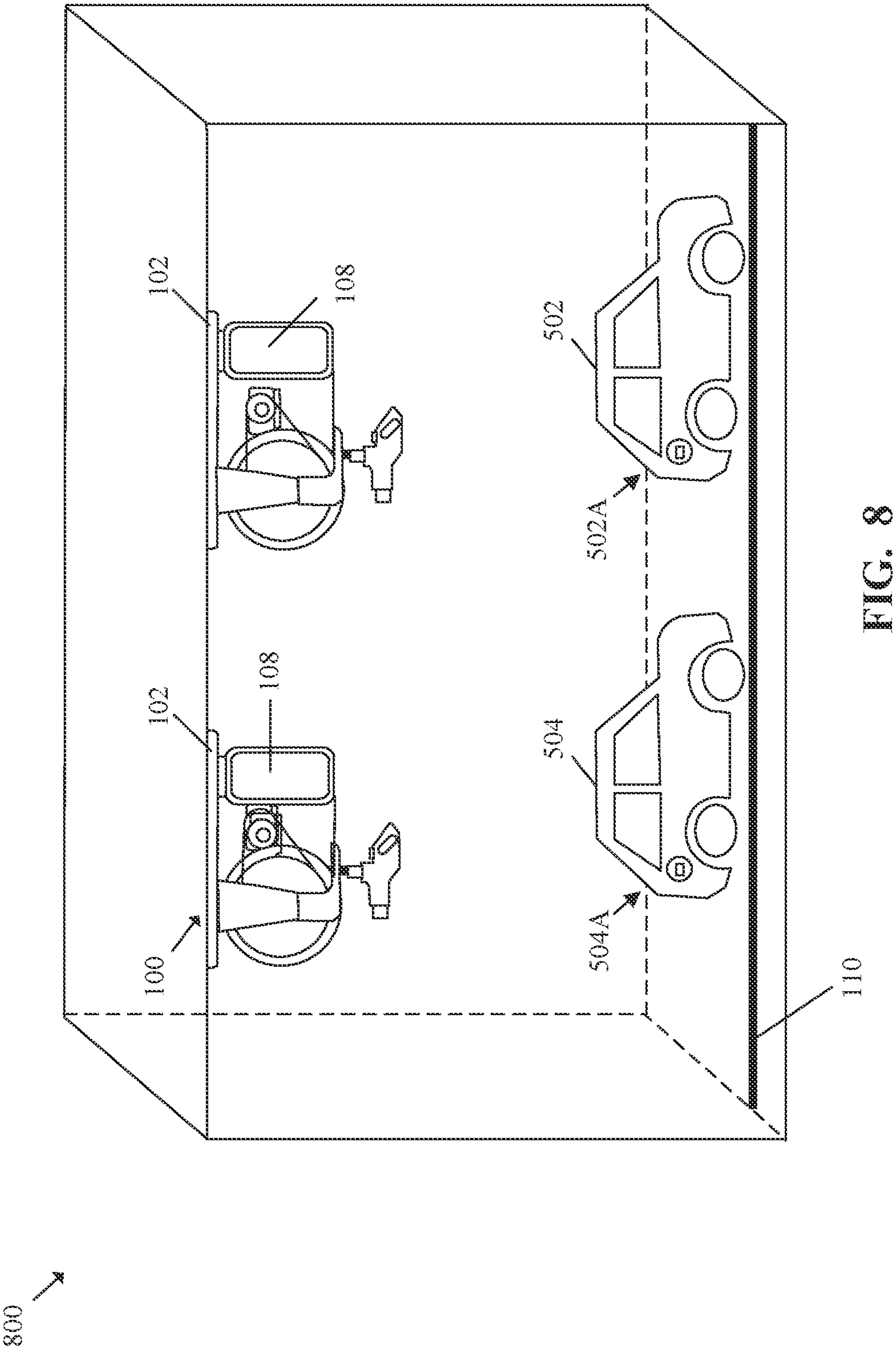
FIG. 8 is a diagram that illustrates a fifth exemplary scenario to depict an operation of a charging apparatus for charging of electric vehicles, in accordance with an embodiment of the disclosure.

FIG. 8 is a diagram that illustrates a fifth exemplary scenario to depict an operation of a charging apparatus for charging of electric vehicles, in accordance with an embodiment of the disclosure. FIG. 8 is explained in conjunction with elements from FIG. 1, FIG. 2, FIG. 3, FIG. 4A, FIG. 4B, FIG. 5A, FIG. 5B, FIG. 6A, FIG. 6B, and FIG. 7. With reference to FIG. 8, there is shown a fifth exemplary scenario 800 of the charging apparatus 100. In the fifth exemplary scenario 800, there is shown a plurality of unitary structures (such as the unitary structure of the charging apparatus 100) disposed on the support structure 102.

In operation, each unitary structure (such as the unitary structure of the charging apparatus 100) of the plurality of unitary structures may be configured to charge each electric vehicle (such as the first electric vehicle 502 and/or the second electric vehicle 504) of the plurality of electric vehicles. For example, all the unitary structures may connect with corresponding electric vehicle of the plurality of electric vehicles, such that, all electric vehicles (such as, the first electric vehicle 502 and the second electric vehicle 504)

parked on the floor surface 110, may be charged in a concurrent manner, without any delay in the charging event.

Figure 9:
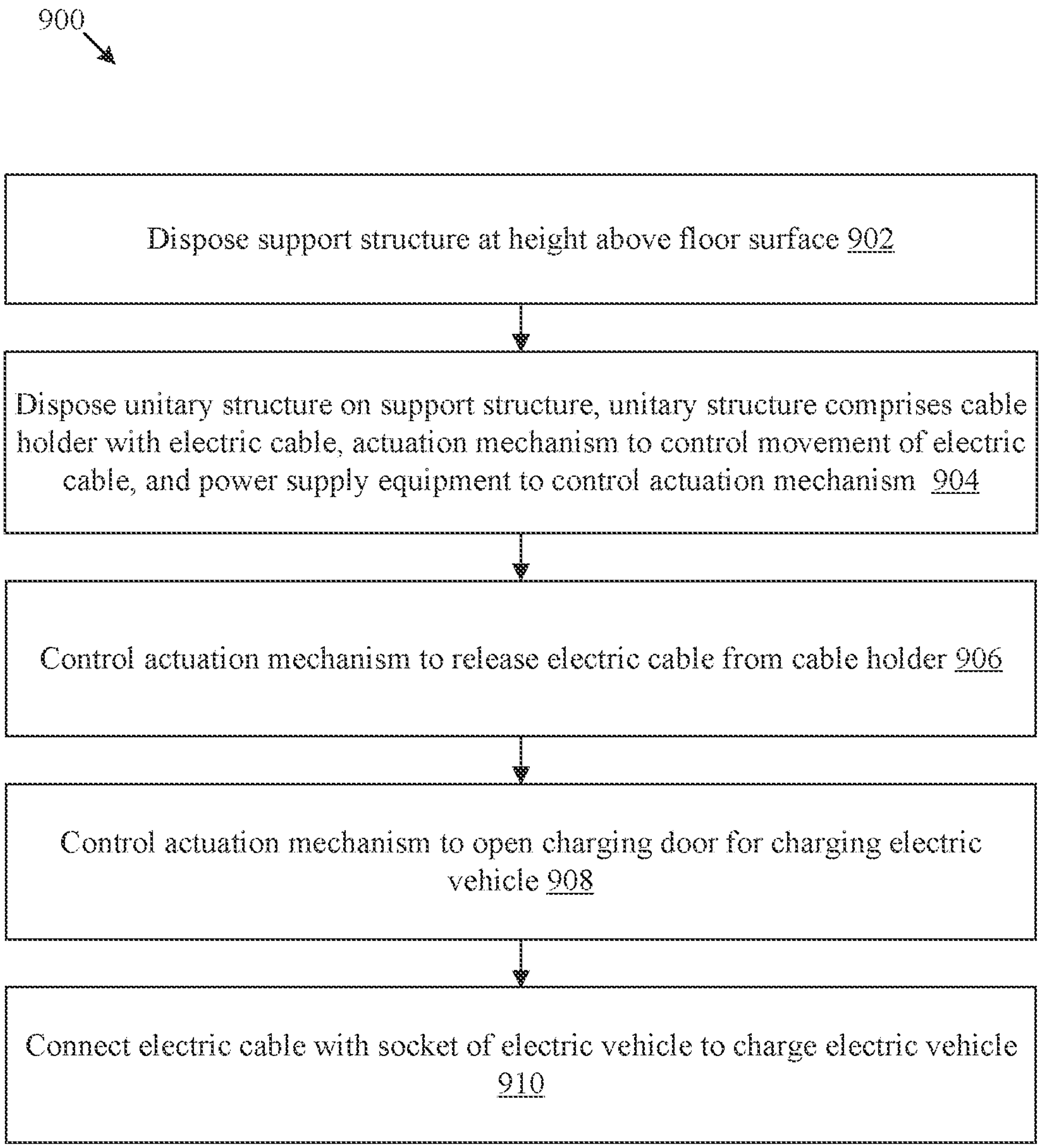
FIG. 9 is a flowchart that illustrates exemplary operations for charging of an electric vehicle, via a charging apparatus, in accordance with an embodiment of the disclosure.

FIG. 9 is a flowchart that illustrates exemplary operations for charging of an electric vehicle, via a charging apparatus, in accordance with an embodiment of the disclosure. FIG. 9 is explained in conjunction with elements from FIG. 1, FIG. 2, FIG. 3, FIG. 4A, FIG. 4B, FIG. 5A, FIG. 5B, FIG. 6A, FIG. 6B, FIG. 7, and FIG. 8. With reference to FIG. 9, there is shown a flowchart 900. The operations from 902 to 910 may be implemented, for example, by the charging apparatus 100 or an operator associated with the charging apparatus 100. The operations of the flowchart 900 may start at 902.

At 902, the support structure 102 may be disposed at the height 110A above the floor surface 110. In an embodiment, the charging apparatus 100 or the operator may dispose the support structure 102 at the height 110A above the floor surface 110, as described further, for example, in FIG. 1.

At 904, the unitary structure of the charging apparatus 100 may be disposed on the support structure 102, the unitary structure may include the cable holder 104 with the electric cable 104A, the actuation mechanism 106 to control movement of electric cable 104A, and the power supply equipment 108 to control the actuation mechanism 106. In an embodiment, the charging apparatus 100 or the operator may dispose the unitary structure on the support structure 102, as described further, for example, in FIG. 1.

At 906, the actuation mechanism 106 may be controlled to release the electric cable 104A from cable holder 104. In an embodiment, the charging apparatus 100 or the operator may control the actuation mechanism 106 to release the electric cable 104A from cable holder 104, as described further, for example, in FIGS. 4A-4B.

At 908, the actuation mechanism 106 may be controlled to open the charging door 302 for charging the electric vehicle 304. In an embodiment, the charging apparatus 100 or the operator may control the actuation mechanism 106 to open the charging door 302 for charging the electric vehicle 304, as described further, for example, in FIG. 3 and FIGS. 4A-4B.

At 910, the electric cable 104A of the charging apparatus 100 may be connected with the socket 114A of the electric vehicle 304 to charge the electric vehicle 304. In an embodiment, the charging apparatus 100 or the operator may connect the electric cable 104A with the socket 114A of the electric vehicle 304, as described further, for example, in FIG. 1.

The flow chart shown in FIG. 9 is illustrated as discrete operations, such as from 902 to 910, which relates to the method of charging the electric vehicle 304 via the charging apparatus 100. However, in certain embodiments, such discrete operations may be further divided into additional operations, combined into fewer operations, or eliminated, depending on the implementation without detracting from the essence of the disclosed embodiments.

Figure 10:
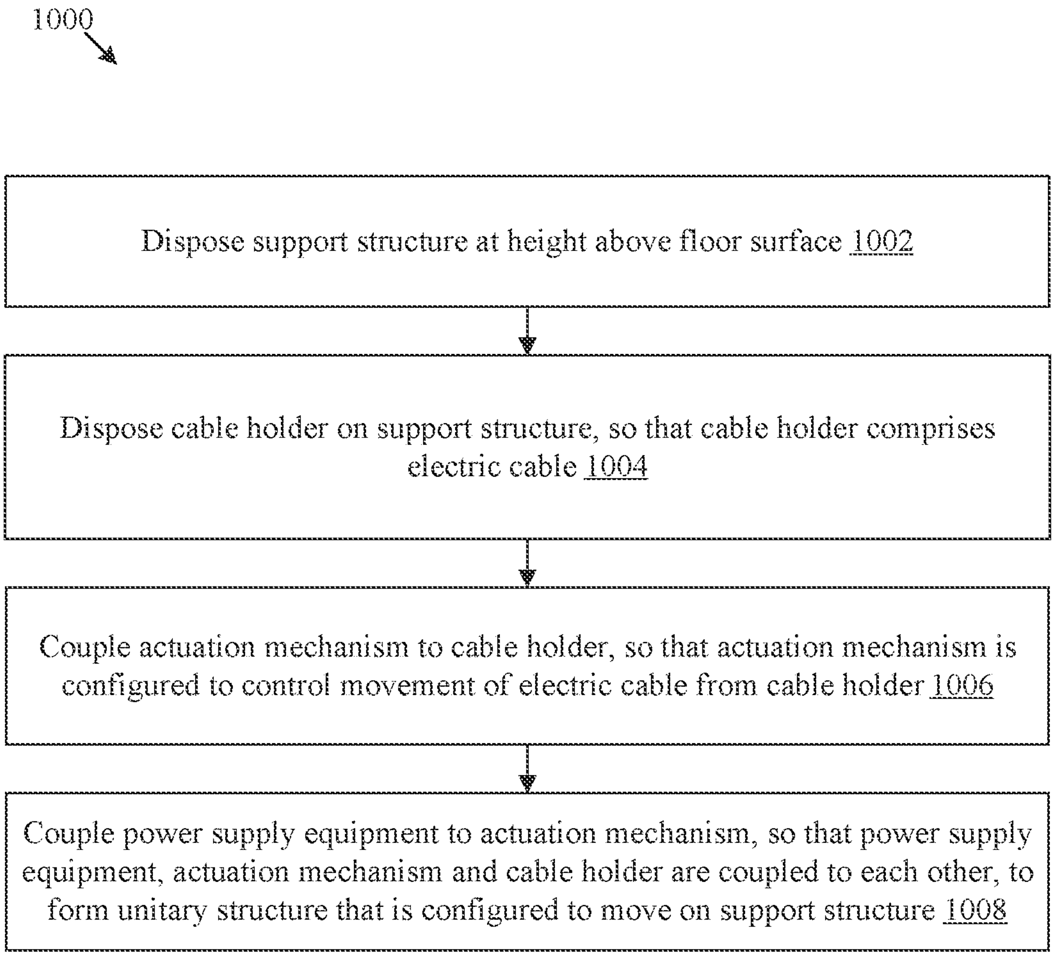
FIG. 10 is a flowchart that illustrates exemplary operations for forming a charging apparatus, in accordance with an embodiment of the disclosure.

FIG. 10 is a flowchart that illustrates exemplary operations for forming a charging apparatus, in accordance with an embodiment of the disclosure. FIG. 10 is explained in conjunction with elements from FIG. 1, FIG. 2, FIG. 3, FIG. 4A, FIG. 4B, FIG. 5A, FIG. 5B, FIG. 6A, FIG. 6B, FIG. 7, FIG. 8, and FIG. 9. With reference to FIG. 10, there is shown a flowchart 1000. The operations from 1002 to 1008 may be implemented, for example, by the charging apparatus 100 or an operator associated with the charging apparatus 100. The operations of the flowchart 1000 may start at 1008.

At 1002, the support structure 102 may be disposed at the height 110A above the floor surface 110. In an embodiment, the charging apparatus 100 or the operator may dispose the support structure 102 at the height 110A above the floor surface 110, as described further, for example, in FIG. 1.

At 1004, the cable holder 104 may be disposed on the support structure 102, such that, the cable holder 104 may include the electric cable 104A. In an embodiment, the charging apparatus 100 or the operator may dispose the cable holder 104 on the support structure 102, as described further, for example, in FIG. 1.

At 1006, the actuation mechanism 106 may be coupled to the cable holder 104, the actuation mechanism 106 is configured to control movement of electric cable from cable holder. In an embodiment, the charging apparatus 100 or the operator may couple the actuation mechanism 106 to the cable holder 104, as described further, for example, in FIG. 1.

At 1008, the power supply equipment 108 may be coupled to the actuation mechanism 106, such that, the power supply equipment 108, the actuation mechanism 106 and cable holder 104 are coupled to each other, to form the unitary structure that is configured to move on support structure 102. In an embodiment, the charging apparatus 100 or the operator may couple the power supply equipment 108 to the actuation mechanism 106 to form the unitary structure, as described further, for example, in FIG. 1.

The flow chart shown in FIG. 9 is illustrated as discrete operations, such as from 902 to 910, which relates to the method of forming the charging apparatus 100 to charge electric components (such as the electric vehicle 304). However, in certain embodiments, such discrete operations may be further divided into additional operations, combined into fewer operations, or eliminated, depending on the implementation without detracting from the essence of the disclosed embodiments.

For the purposes of the present disclosure, expressions, such as "including", "comprising", "incorporating", "consisting of", "have", "is", used to describe and claim the present disclosure, are intended to be construed in a non-exclusive manner, namely allowing for items, components or elements not explicitly described also to be present. Reference to the singular is also to be construed to relate to the plural. Further, all joinder references (e.g., attached, coupled, connected, o the like) are used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A charging apparatus, comprising:

a support structure disposed at a height above a floor surface;

a cable holder disposed on the support structure, wherein the cable holder comprises an electric cable;

an actuation mechanism coupled to the cable holder, wherein the actuation mechanism is configured to control a movement of the electric cable from the cable holder; and a power supply equipment coupled to the actuation mechanism, wherein, the power supply equipment, the actuation mechanism and the cable holder are coupled to each other, to form a unitary structure that is configured to move on the support structure, wherein the cable holder and the power supply equipment are separated by a first distance, wherein a first electric vehicle is disposed at a first location of the floor surface and a second electric vehicle is disposed at a second location of the floor surface, the first location and the second location being separated by a second distance, and wherein the actuation mechanism is further configured to control a movement of the cable holder on the support structure from the power supply equipment such that the first distance is equal to the second distance.

2. The charging apparatus according to claim 1, wherein the support structure is a guide rail, and the power supply equipment is an electric vehicle supply equipment, which is configured to move on the guide rail.

3. The charging apparatus according to claim 1, wherein the cable holder is a pulley drive that is configured to reel the electric cable, wherein the actuation mechanism is configured to control the pulley drive to releasably reel the electric cable.

4. The charging apparatus according to claim 1, wherein, in a charging event, the actuation mechanism is configured to control the movement of the electric cable from the cable holder towards the floor surface.

5. The charging apparatus according to claim 1, wherein, in a charging event, the actuation mechanism is configured to control a charging door of an electric vehicle, to charge the electric vehicle.

6. The charging apparatus according to claim 1, wherein, based on a completion of a charging event, the actuation mechanism is configured to control the movement of the electric cable from the floor surface towards the cable holder.

7. The charging apparatus according to claim 1, wherein the cable holder further includes a handle, which is coupled to an end of the electric cable, the handle has a selection button, which is configured to control a movement of the electric cable, from the cable holder.

8. The charging apparatus according to claim 1, wherein the cable holder further includes a handle, which is coupled to an end of the electric cable, the handle has an electric contact, which is configured to connect with a socket associated with a battery of a component, to further charge the component.

9. The charging apparatus according to claim 8, wherein the component is an electric vehicle, and wherein the handle further comprises a selection button, which is configured to control a charging door of the electric vehicle.

10. The charging apparatus according to claim 1, wherein, the power supply equipment is configured to activate the actuation mechanism, wherein, when activated, the unitary structure is moved from a first location of the floor surface to a second location of the floor surface, via the support structure.

11. The charging apparatus according to claim 10, wherein a first electric vehicle is disposed at the first location and a second electric vehicle is disposed at the second location, wherein, based on a completion of a charging event for the first electric vehicle at the first location, the unitary structure is configured to move from the first location to the second location, via the support structure, to initiate another charging event for the second electric vehicle located at the second location.

12. The charging apparatus according to claim 1, wherein the power supply equipment is configured to be inductively coupled to the support structure, and the actuation mechanism and the cable holder are configured to inductively receive electric power supply from the support structure.

13. The charging apparatus according to claim 1, further comprising a plurality of cable holders and a plurality of actuation mechanisms, which are coupled to the power supply equipment, wherein each cable holder of the plurality of cable holders and corresponding actuation mechanism of the plurality of actuation mechanisms is configured to charge each electric vehicle of a plurality of electric vehicles.

14. The charging apparatus according to claim 1, further comprising a plurality of unitary structures disposed on the support structure, wherein, each unitary structure of the plurality of unitary structures is configured to charge each electric vehicle of a plurality of electric vehicles.

15. A method, comprising:

disposing a support structure at a height above a floor surface;

disposing a unitary structure on the support structure, wherein the unitary structure comprises a cable holder with an electric cable, an actuation mechanism to control a movement of the electric cable, and a power supply equipment to control the actuation mechanism;

wherein the cable holder and the power supply equipment are separated by a first distance;

wherein a first electric vehicle is disposed at a first location of the floor surface and a second electric vehicle is disposed at a second location of the floor surface, the first location and the second location being separated by a second distance;

controlling the actuation mechanism to move the cable holder on the support structure from the power supply equipment such that the first distance is equal to the second distance;

controlling the actuation mechanism to release the electric cable from the cable holder;

controlling the actuation mechanism to open a charging door for charging an electric vehicle; and connecting the electric cable with a socket of the electric vehicle to charge the electric vehicle.

16. The method according to claim 15, further comprising:

releasing the electric cable from the socket based on a completion of a charging event; and controlling the actuation mechanism to retract the electric cable towards the cable holder.

17. The method according to claim 15, wherein the charging door is one of: a lid of the socket of the electric vehicle or a garage door of the electric vehicle.

18. A method, comprising:

disposing a support structure at a height above a floor surface;

disposing a cable holder on the support structure, wherein the cable holder comprises an electric cable;

coupling an actuation mechanism to the cable holder, wherein the actuation mechanism is configured to control a movement of the electric cable from the cable holder;

coupling a power supply equipment to the actuation mechanism, wherein, the power supply equipment, the actuation mechanism, and the cable holder are coupled to each other, to form a unitary structure that is configured to move on the support structure;

separating the cable holder and the power supply equipment by a first distance;

disposing a first electric vehicle at a first location of the floor surface and a second electric vehicle at a second location of the floor surface, the first location and the second location being separated by a second distance; and configuring the actuation mechanism to control a movement of the cable holder on the support structure from the power supply equipment such that the first distance is equal to the second distance.

* * * * *